Patented Oct. 9, 1945

2,386,636

UNITED STATES PATENT OFFICE 2,386,636

NEW STEROL DERIVATIVES

Hans R. Rosenberg and Stockton G. Turnbull, Jr., Wilmington, Del., assignors to E. I. du Pont de Nemours & Company, Wilmington, Del., a corporation of Delaware No Drawing. Application January 1, 1943, Serial No. 471,060

3 Claims. (Cl. 260—397.2)

This invention relates to new sterol derivatives and more particularly refers to ethers of sterol derivatives such as keto sterols, hydroxy sterols and dehydro sterols.

It is an object of this invention to produce ethers of sterol derivatives. A further object is to produce ethers of keto sterols, hydroxy sterols and dehydro sterols. A still further object is to produce new sterol derivatives which are of particular value in the synthesis of vitamins and provitamins. A still further object is to produce ethers of sterol derivatives which are stable and may be stored for considerable periods of time under widely varying conditions without noticeable deterioration. A still further object is to produce ethers of various sterol derivatives which may be simply and economically converted to provitamins and vitamins, particularly provitamins D and vitamins D. Additional objects will become apparent from a consideration of the following description and claims.

These objects are attained in accordance with the herein described invention wherein keto sterols, hydroxy sterols and dehydro sterols are produced in the form of their ethers. In a more restricted sense, this invention is directed to the etherification of keto sterols, particularly 7-keto sterols and preferably 7-keto-cholesterol. In a still more restricted sense, this invention is directed to the reduction of etherified keto sterols, especially those previously mentioned, to the corresponding hydroxy sterols. In a still more restricted sense, this invention is concerned with the esterification of the resulting etherified hydroxy sterols, especially those previously mentioned, and the decomposition thereof by treatment at elevated temperatures to produce etherified dehydro sterols. In its preferred embodiment this invention pertains to ethers of 7-keto-cholesterol, 7-hydroxy-cholesterol and 7-dehydro-cholesterol, and the processes for the production of said compounds. This invention is also concerned with other processes for the production of the foregoing and related compounds, which processes will be hereinafter referred to.

The invention may be more readily understood by a consideration of the following illustrative examples wherein the quantities are stated in parts by weight.

EXAMPLE I

3-trityl ether of cholesterol 38.6 parts of cholesterol and 36.2 parts of trityl chloride were heated under reflux for 2.5 hours in 100 parts of anhydrous pyridine. The cold pyridine solution was poured into ether and the pyridine and its hydrochloride formed in the reaction were removed by washes with water and dilute hydrochloric acid. The ether on concentration gave a yellow oil which was quickly dissolved while still warm in 400 parts of hot acetone. On cooling, the 3-trityl ether of cholesterol crystallized. The analytical sample, prepared by several recrystallizations from acetone and ethyl acetate, melted at 137.5–139° C. and depressed the melting point of cholesterol to 119–126° C.

Cholesterol can be regenerated from this new ether by heating the latter, dissolved in 30 parts of acetic acid, at 55° C. De-etherification occurs either with glacial or aqueous acetic acid. Also, by heating the ether in 20 parts of acetone containing one part of $1NH_2SO_4$, cholesterol is regained. The ether is stable, however, when heated in 22 parts of acetone containing 1.5 parts of water and 2 drops of piperidine for 2 hours. Also, no de-etherification occurs when heated for 2.5 hours in 20 parts of 10% propanolic potassium hydroxide.

EXAMPLE II

3-trityl ether of 7-keto-cholesterol

Mauthner and Suida (Monat. 17, 595) have described the preparation of 7-keto-cholesterol to which they ascribe a M. P. of 157° C., by saponification of 7-keto-cholesteryl acetate in hot dilute methanolic-KOH. We have found that the pure product obtained by this method actually melts at 170–172° C. Care must be exercised in this preparation, however, for 7-keto-cholesterilene of M. P. 112–113° C. is formed if the correct procedure is not followed exactly.

By a method similar to that described in Example I, 32 parts of 7-keto-cholesterol was reacted with 29 parts of trityl chloride in 200 parts of dry pyridine. There was obtained 22 parts of the pure 3-trityl ether of 7-keto-cholesterol with a M. P. of 186–188.5° C. (from ethyl acetate) after several recrystallizations.

EXAMPLE III

3-trityl ether of 7-hydroxy-cholesterol 6.4 parts of the above 3-trityl ether of 7-keto-cholesterol was treated at reflux with 2.11 parts of aluminum isopropoxide in 300 parts of anhydrous isopropanol, and the acetone formed in the reduction was removed by fractional distillation with some isopropanol over a period of 16 hours. Analysis of the distillate for acetone indicated a quantitative reduction to the 7-hydroxy body to have occurred.

The isopropanol solution was concentrated under vacuum at 50° C., and the concentrate was poured into cold water. Two hundred parts of 1NNaOH was added and the mixture was extracted into ether. The ethereal layer was washed repeatedly with 1NNaOH and then water, after which it was concentrated to yield the new 3-trityl ether of 7-hydroxy-cholesterol as a white, fluffy amorphous solid which was quite soluble in the usual organic solvents with the exception of methanol and ethanol. When melted with chloral hydrate the color was at first a light yellow which rapidly became green and finally turned to the deep aquamarine blue obtained by melting chloral hydrate with 7-hydroxy-cholesterol and its derivatives.

A small amount of the new 3-trityl ether of 7-hydroxy-cholesterol was warmed in glacial acetic acid at 70–80° C. for three minutes. On cooling, 7-hydroxy-cholestrol solvated with acetic acid was obtained as white crystals that melted at 154–164° C. This new form of 7-hydroxy-cholestrol has been described by Rosenberg & Carroll in co-pending application, S. N. 449,516.

EXAMPLE IV

*Benzoate of the 3-trityl ether of 7-hydroxy-cholesterol*

The 3-trityl ether of 7-hydroxy-cholesterol was dissolved in pyridine and benzoylated with benzoyl chloride to yield the new 7-benzoate of the 3-trityl ether of 7-hydroxy-cholesterol. This was quite soluble in the usual organic solvents with the exception of methanol and ethanol, and could be freed of other esters formed in the benzoylation by slurrying with cold methanol.

EXAMPLE V

*3-trityl ether of 7-dehydro-cholesterol*

0.387 part of the 3-trityl ether of 7-hydroxy-cholesteryl benzoate was dissolved in 25 parts of dimethyl aniline. The solution was introduced into a glass tube, sealed under vacuum, and heated at 195° C. for two hours according to the method of U. S. 2,209,934. The solution was dissolved in ether and the dimethyl aniline and benzoic acid were removed by extraction with dilute HCl and then with dilute NaOH. There was obtained from the ether the 3-trityl ether of 7-dehydro-cholesterol with a M. P. of 105–107° C. when recrystallized from acetone-methanol mixture.

The 3-trityl ether of 7-dehydro-chloesterol has also been obtained by treatment of 70 parts of 7-dehydro-cholesterol and 66 parts of trityl chloride in 1000 parts of pyridine at 115° C. according to the method of Example I.

The 3-trityl ether of 7-dehydro-cholesterol is apparently fairly stable to heat in weakly alkaline solutions. When heated with weak acids, as described in Example I for regeneration of cholesterol from the trityl ether of cholesterol, the 7-dehydro-cholesterol (provitamin D₃) is formed. However, care must be taken not to expose the trityl ether of 7-dehydro-cholesterol for a prolonged period of time to acidic materials, for the 7-dehydro-cholesterol initially formed is rapidly destroyed in the presence of strong acids or of weak acids at high temperatures.

By the following series of reactions, the methyl ether of 7-dehydro-cholesterol has been obtained:

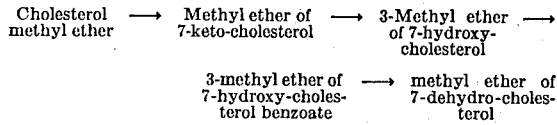

EXAMPLE VI

*Methyl ether of 7-keto-cholesterol*

To 40 parts of the methyl ether of cholesterol dissolved in 400 parts of glacial acetic acid at 55° C. there was added a solution of 25 parts of chromic anhydride, dissolved in a mixture of 21 parts of water and 85 parts of acetic acid, at such a rate that the temperature remained at 55° C. The reaction mixture was then agitated at this temperature for four hours. Then 50 parts of alcohol was added.

Most of the acetic acid was removed by vacuum distillation. The residue was drowned in water and extracted with ether. The acetic acid that remained and the organic acids formed in the oxidation were removed from the ether solution by extraction with dilute caustic. After washing and drying, the ethereal layer was concentrated and 19 parts of oily white crystals were obtained. By a hot extraction of this product with methanol the methyl ether of 7-keto-cholesterol was separated from the insoluble unreacted cholesterol methyl ether. By recrystallization from acetone the methyl ether of 7-keto-cholesterol with a M. P. of 121–123° C. was obtained.

EXAMPLE VII

*7-hydroxy-cholesterol-3-methyl ether*

6.6 parts of the methyl ether of 7-keto-cholesterol was reacted in anhydrous isopropanol with aluminum isopropoxide as described in Example III. There was obtained 5.5 parts of almost pure 3-methyl-ether of 7-hydroxy-cholesterol. When recrystallized from acetone this material had a M. P. of 92–93.5° C. and gave a deep blue color when melted with chloral hydrate.

EXAMPLE VIII

*3-methyl-ether of 7-hydroxy cholesteryl benzoate*

To 5.2 parts of the above 3-methyl ether of 7-hydroxy-cholesterol dissolved in 25 parts of cold anhydrous pyridine there was added with agitation 12 parts of benzoyl chloride. There was obtained from the reaction mixture the 3-methyl-ether of 7-hydroxy cholesteryl benzoate, which melted at 128–129° C. when recrystallized from a mixture of acetone and methanol.

EXAMPLE IX

*Methyl ether of 7-dehydro-cholesterol*

One part of the above 3-methyl ether of 7-hydroxy-cholesteryl benzoate was heated with 50 parts of redistilled dimethyl aniline under nitrogen at gentle reflux for 2 hours. When processed according to the method of Example 5, there was obtained the methyl ether of 7-dehydro-cholesterol. This melted at 109–111° C. after recrystallization from acetone, and gave a depression when melted with the 3-methyl ether of 7-hydroxy-cholesteryl benzoate. Its spectrographic absorption curve was very similar to that of 7-dehydro-cholesterol.

EXAMPLE X

*Ethyl ether of 7-dehydro-cholesterol*

This may be prepared from the ethyl ether of 7-keto-cholesterol by the method given in the above examples. It has also been prepared from 7-dehydro-cholesterol itself in the following way:

To 88 parts of anhydrous benzene agitated at 70° C., there was added 0.80 parts of potassium. This melted and formed very small globules which floated in the benzene. At 70 C. there was slowly introduced dropwise a solution of three parts of 7-dehydro-cholesterol in 30 parts of anhydrous benzene. The mixture was agitated rapidly at 75° C. for one half hour to ensure complete formation of the potassium derivative, and in so doing the mixture became somewhat viscous. Then at 70° C. there was added 44 parts of ethyl iodide and the mixture was heated at gentle reflux for two hours. The mixture was cooled and 25 parts of alcohol was added.

After washing with water, the benzene layer was concentrated under vacuum. There was obtained three parts of the ethyl ether of 7-dehydro-cholesterol with a M. P. of 103–105° C. when recrystallized from aacetone, from which it crystallized slightly solvated. This new ether, when mixed with 7-dehydro-cholesterol itself, gave a mixed M. P. of 86–89° C. That the ethyl ether had been definitely formed by this method was proved by the fact that no acetate could be prepared with acetic anhydride in pyridine. The ethyl ether of 7-dehydro-cholesterol was recovered unchanged.

EXAMPLE XI

*Di-(7-keto-cholesteryl) ether*

To 450 parts of dry toluene there was added with agitation at 100° C. 3.9 parts of potassium and 10 parts of 7-keto-cholesterol dissolved in toluene. After heating with agitation at 100° C. for 1.5 hours, there was added 141 parts of methyl iodide and the mixture was agitated at 100° C. for 6 hours. After cooling and filtering from the 13.5 parts of potassium iodide formed in the reaction, the toluene was removed under vacuum and 10.5 parts of an orange oil was obtained. By slurrying with acetone, crystals that melted at 222–227° C. were obtained. Upon recrystallization from benzene-alcohol the new di-(7-keto-cholesteryl) ether was obtained with a M. P. of 245–249° C. Its molecular weight and analysis indicated it to be the compound named.

It is to be understood that the foregoing examples are representative merely of a few of the many embodiments to which this invention is susceptible. They may be varied widely with respect to the individual reactants, the quantities thereof and the conditions of reaction without departing from the scope hereof.

In place of the sterol derivatives previously mentioned it is to be understood that numerous other sterols may be employed. Likewise, in place of a single sterol two or more sterols may be used in admixture with one another. A representative few of the many sterols coming within this category are cholesterol, stigmasterol, sitosterol, campesterol and the like.

The foregoing, or related sterols, are, either before or after etherification, converted to their keto derivatives by suitable and well known reactions; for example, by oxidation with chromic acid. The resulting keto sterol is then etherified, for instance, by treatment with an etherifying agent in the presence of an assistant, such as an acid acceptor.

Etherifying agents suitable for use herein are well known and, for the sake of brevity, will not be described in detail. Suffice it to say that they may be compounds of the alkyl, aralkyl or aryl series.

The etherified keto sterols may be converted to ethers of the corresponding hydroxy sterol by reduction of the keto group thereof to a hydroxyl group. This reduction may be accomplished, for example, by treating the etherified keto sterol with aluminum in the presence of anhydrous isopropyl alcohol.

The resulting etherified hydroxy sterols may be converted to the corresponding dehydro sterols by esterifying the hydroxy group and subjecting the esters to controlled decomposition at elevated temperatures. In this reaction it is preferable to convert the etherified hydroxy sterol to a benzoate ester and to carry out the following decomposition in the presence of a diluent such as dimethylaniline.

In accordance with the preceding description hereof it is to be understood that etherified derivatives of the sterols embraced herein may be produced by various processes. For example, the methyl ether of 7-keto-cholesterol may be prepared by direct oxidation of cholesterol methyl ether. Likewise, the ethyl ether of 7-dehydro-cholesterol may be produced by the action of ethyl iodide upon the potassium derivative of 7-dehydro-cholesterol. The trityl ether of 7-dehydro-cholesterol may be produced by the action of trityl chloride in pyridine upon 7-dehydro-cholesterol. These reactions are, of course, similarly applicable to other sterol derivatives.

As previously mentioned, the preferred embodiment of this invention is concerned with the production of ethers of 7-keto-cholesterol, 7-hydroxy-cholesterol and 7-dehydro-cholesterol.

By means of the present invention a new and important group of sterol derivatives is now for the first time rendered available. These derivatives are stable and may be stored for extended periods of time without substantial deterioration. They are of appreciable value in the production of provitamins and vitamins, patricularly provitamin D and vitamin D. In addition to the foregoing, they have numerous uses in the industrial arts and particularly in the field of organic synthesis.

As many widely different embodiments of this invention may be made without departing from the spirit and scope thereof, it is to be understood that the invention is not limited to the specific embodiments thereof except as defined in the appended claims.

We claim:

1. A process which comprises reacting the 3-trityl ether of 7-keto cholesterol with aluminum isopropoxide in anhydrous isopropanol to reduce the 7-keto group to the 7-hydroxyl group, esterifying said 7-hydroxyl group with benzoyl chloride, heating the resulting compound in the presence of dimethyl aniline to split off the benzoyl radical in the 7-position in the form of benzoic acid with the production of the 3-trityl ether of 7-dehydro cholesterol.

2. A process which comprises reacting the methyl ether of 7-keto cholesterol wtih aluminum isopropoxide in anhydrous isopropanol to reduce the 7-keto group to the 7-hydroxyl group, esterifying said 7-hydroxyl group with benzoyl chloride, heating the resulting compound in the presence of dimethyl aniline to split off the benzoyl radical in the 7-position in the form of benzoic acid with the production of the 3-methyl ether of 7-dehydro cholesterol.

3. A process which comprises reacting a 3-ether of 7-keto cholesterol with aluminum isopropoxide in anhydrous isopropanol to reduce the 7-keto group to the 7-hydroxyl group, esterifying said 7-hydroxy group with benzoyl chloride, heating the resulting compound in the presence of a diluent comprising dimethyl aniline to split off the benzoyl radical in the 7-position in the form of benzoic acid with the production of a 3-ether of 7-dehydro cholesterol.

HANS R. ROSENBERG.
STOCKTON G. TURNBULL, JR.